340-870.13 SR
OR 4,037,199

United Sta[redacted] [11] 4,037,199
Rozehnal et al. [45] July 19, 1977

[54] APPARATUS FOR SENSING, TRANSMITTING AND DISPLAYING SIGNAL STATES

[75] Inventors: Günther Rozehnal, Oberhaching, Furth; Hartmut Wedler, Munich, both of Germany

[73] Assignee: Siemens Aktiengesellschaft, Munich, Germany

[21] Appl. No.: 632,912

[22] Filed: Nov. 18, 1975

[30] Foreign Application Priority Data

Dec. 20, 1974 Germany ............................ 2455055

[51] Int. Cl.[2] ................................................ H04J 3/00
[52] U.S. Cl. .............................. 340/150; 179/15 AL; 340/183; 340/413
[58] Field of Search ........... 340/150, 183, 413, 324 R; 179/15 AL

[56] References Cited

U.S. PATENT DOCUMENTS

| | | | |
|---|---|---|---|
| 2,899,567 | 8/1959 | Romano | 340/183 X |
| 3,145,374 | 8/1964 | Benner et al. | 340/183 |
| 3,248,650 | 4/1966 | Bialkowski et al. | 340/183 X |
| 3,293,605 | 12/1966 | Moore | 340/150 |
| 3,735,396 | 5/1973 | Getchell | 340/413 |
| 3,812,487 | 5/1974 | Burton | 340/183 X |
| 3,909,788 | 9/1975 | Kaelin et al. | 340/324 R |

*Primary Examiner*—David L. Traeton
*Attorney, Agent, or Firm*—Gerald L. Lett

[57] ABSTRACT

Apparatus for sensing, communicating and displaying signal states in a multiplicity of functional units is described. A signal multiplexer is assigned to each given functional unit; the multiplexer inputs are connected to signal lines carrying the signal states of the functional unit. The outputs of the signal multiplexers are connected by time division multiplex (TDM) trunks to a group multiplexer. A multiplexer control applies first encoded selection signals to the signal multiplexers for selection of signal lines at the signal multiplexers. The selected signaling lines are interrogated, and the signal states are transmitted timewise in parallel with the signal states of other functional units over the corresponding TDM trunks to the group multiplexer. The multiplexer control applies second encoded selection signals to the group multiplexer for connecting the TDM trunks to group TDM trunks throughout the duration of a sampling phase. At the display location, a shift register receives the signal states from the group TDM trunks. The clock pulse coupled to the shift register is interrupted upon acceptance of signal states sent from a functional unit for the duration of a display phase.

5 Claims, 2 Drawing Figures

APPARATUS FOR SENSING, TRANSMITTING AND DISPLAYING SIGNAL STATES

BACKGROUND OF THE INVENTION

This invention relates to an apparatus for sensing, transmitting and displaying signal states of a multiplicity of functional units in accordance with the time division multiplex principle.

In systems having a plurality of similarly constructed functional units, e.g., in switching systems, it is often necessary to register the signal states appearing at selected points in the functional units and to transmit and analyze them at a central point. To do this, it is a commonly known technique to pick up the signal states, e.g., over additional contact points and to transmit the same over an extensive supplementary network used only for this purpose. Very large expenditures are required for the registration and transmission of signal states with increasing numbers of signal states and functional units.

It is an object of the invention to provide apparatus for performing the foregoing functions at a considerably reduced cost.

A further object of the invention is to provide a simpler design for the wiring network, while at the same time achieving greater flexibility with respect to the selection of functional units to be interrogated. For example, in addition to the interrogation of all the functional units it shall also be possible to interrogate individual selected functional units.

SUMMARY OF THE INVENTION

In accordance with the invention, the foregoing and other objects are achieved in that each functional unit is assigned a signal multiplexer. The signal multiplexer at a given functional unit is connected at its input to the signaling lines of the functional unit, and at its output, is connected to a signal group multiplexer via a time division multiplex (TDM) trunk. There is provided a multiplexer control over the first control leads of which connected in parallel to the signal multiplexers, there are available first encoded selection signals for the selection of the signaling lines in each signal multiplexer. Through interpretation of these encoded selection signals the individual signaling lines are interrogated, and the signal states are transmitted from the signal multiplexers on a time division basis in parallel over the corresponding TDM trunks to the signal group multiplexer. For the control of the signal group multiplexer, there are applied, from the multiplexer control via second control leads, second encoded selection signals for the selection of the TDM trunks. Through the interpretation of these second encoded selection signals the individual TDM trunks may be connected throughout the duration of a scanning phase to a group TDM trunk. There is provided at a display location at least one shift register, the shift register clock pulse of which is interrupted upon acceptance of the signal states sensed by a functional unit throughout the duration of a display phase.

Thus, the reduction of the wiring results from a two-stage line reduction. In the first stage the signaling lines of the functional units are combined in multiplex, while in a second stage the individual TDM trunks emanating from the functional units are combined into a group TDM trunk.

According to another development of the invention, the sampling of the TDM trunks emanating from the functional units may be controlled in the signal group multiplexer. The control of the sampling may be effected in such a manner that either all TDM trunks are sampled in turn, or that at all times only a single, but freely selectable TDM trunk is sampled. However, it is also possible to sample only specified, but freely selectable TDM trunks. This results in the advantage that, where necessary, the signal states of all the functional units, the signal states of a single functional unit, or those of some selected functional units are registered and transmitted.

The transmitted signal states are available for display or testing purposes at a display site where a shift register is provided as a serial/parallel converter. The shift register clock pulse is stopped upon acceptance of all the signal states emitted from a functional unit in the sampling phase throughout the duration of the analysis. It is advantageous to select the period referred to as a display phase to be greater than the duration of a sampling phase.

A visual display panel may be provided to display the signal states in which the visual display means, e.g., light-emitting diodes, are combined into groups, each group being connected to the outlets of the shift register under control of the second encoded signals delivered by the multiplexer control. The use of a shift register at the evaluating site, the shift-register clock pulse of which may be controlled, has the advantage that in the case of a signal display one need not use a special display register. If with a suitable sampling frequency the display phase is chosen to be four to five times larger than the sampling phase, this will only result in a reduction of the brightness of the visual display means without causing a flicker effect.

The number of the groups of display means may be the same as that of the functional units, but it may also be less. The latter is convenient only if the signal states of specified functional units are to be visually displayed.

BRIEF DESCRIPTION OF THE DRAWINGS

The principles of the invention will be more readily understood by reference to the description of a preferred embodiment constructed accordingly given below in conjunction with the drawings which are briefly described as follows.

DETAILED DESCRIPTION OF THE PREFERRED EMBODIMENT

Figure 1:
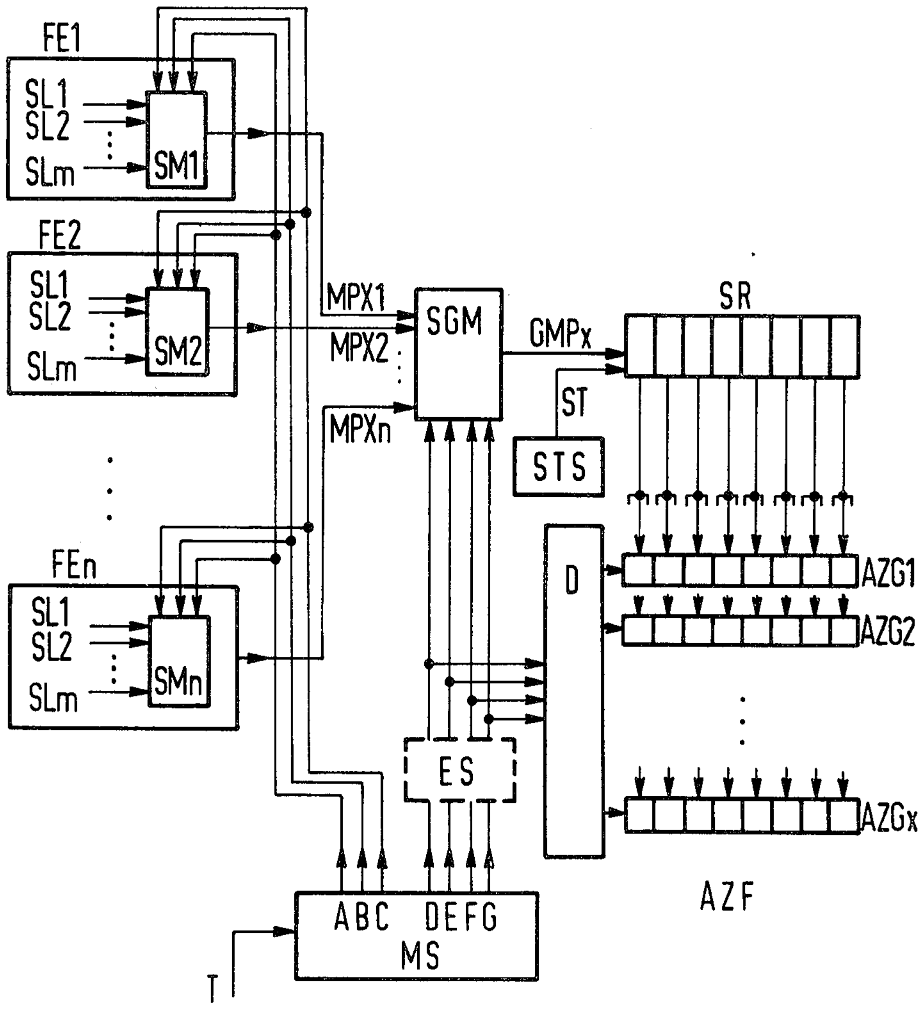
FIG. 1 is a schematic diagram of apparatus according to the invention.

The apparatus of FIG. 1 contains *n* functional units FE1 to FE*n*. In each functional unit there is provided a signal multiplexer SM1 to SM*n*, as known in the prior art, having inputs connected to signaling lines SL1 to SL*m*, on which appear the signal states in a functional unit. Each signal multiplexer SM1 to SM*n* is connected by a TDM trunk MPXL to MPX*n* to the input of a second multiplexer known in the prior art as a signal group multiplexer SGM. A common multiplexer control MS is provided to control the signal multiplexer SM1 to SM*n* and the signal group multiplexer SGM. This multiplexer control MS may, for example, be realized by a metering module of known construction.

The address specification for the individual signaling lines SL1 to SL$n$ (first encoded address signal over the control leads ABC) or for the individual TDM trunks MPX1 to MPX$n$ (second encoded address signal over the control leads DEFG) are available in encoded form under the control of the input clock pulse T over the signaling lines ABC and DEFG of the multiplexer control S. In the example of FIG. 1 it is assumed that a 3-bit code is used for the selection of the signaling lines and a 4-bit code for the selection of the TDM trunks. This means that in the example, $m = 8$ signaling lines may be connected to each signal multiplexer and $n = 16$ TDM trunks to the signal group multiplexer. The control leads are connected in parallel to the signal multiplexers SM1 to SM$n$ in the individual functional units FE1 to FE$n$. It is possible to control the selection of the TDM trunks in the signal group multiplexer SGM by the control set ES shown by the dotted line. Thus, by adjusting a specific address code only a single TDM trunk can be interrogated at all times, but it is likewise possible to sample two previously set TDM trunks alternately, or more than one or all TDM trunks cyclically.

The second encoded control signal appearing on control leads DEFG is at the same time applied to a decoding circuit D in the evaluating circuit, the operation of which will be described below. In the evaluating circuit there is provided a shift register SR, whose number of positions is defined by the number of signaling lines SLT to SL$m$ connected to a signal multiplexer. The shift register serves for the parallel/series conversion of the signals transmitted from the signal group multiplexer SGM over the group TDM trunk GMPX. The control of the shift register SR takes place with a shift-register clock pulse ST which is supplied by a shift clock pulse control STS. A display panel AZF is provided for the visual display of the signal states in which visual display means, e.g., light-emitting diodes, are combined into display groups AZG1 to AZGX.

The operation of the apparatus of FIG. 1 will be described below with reference to the diagram of FIG. 2.

Figure 2:
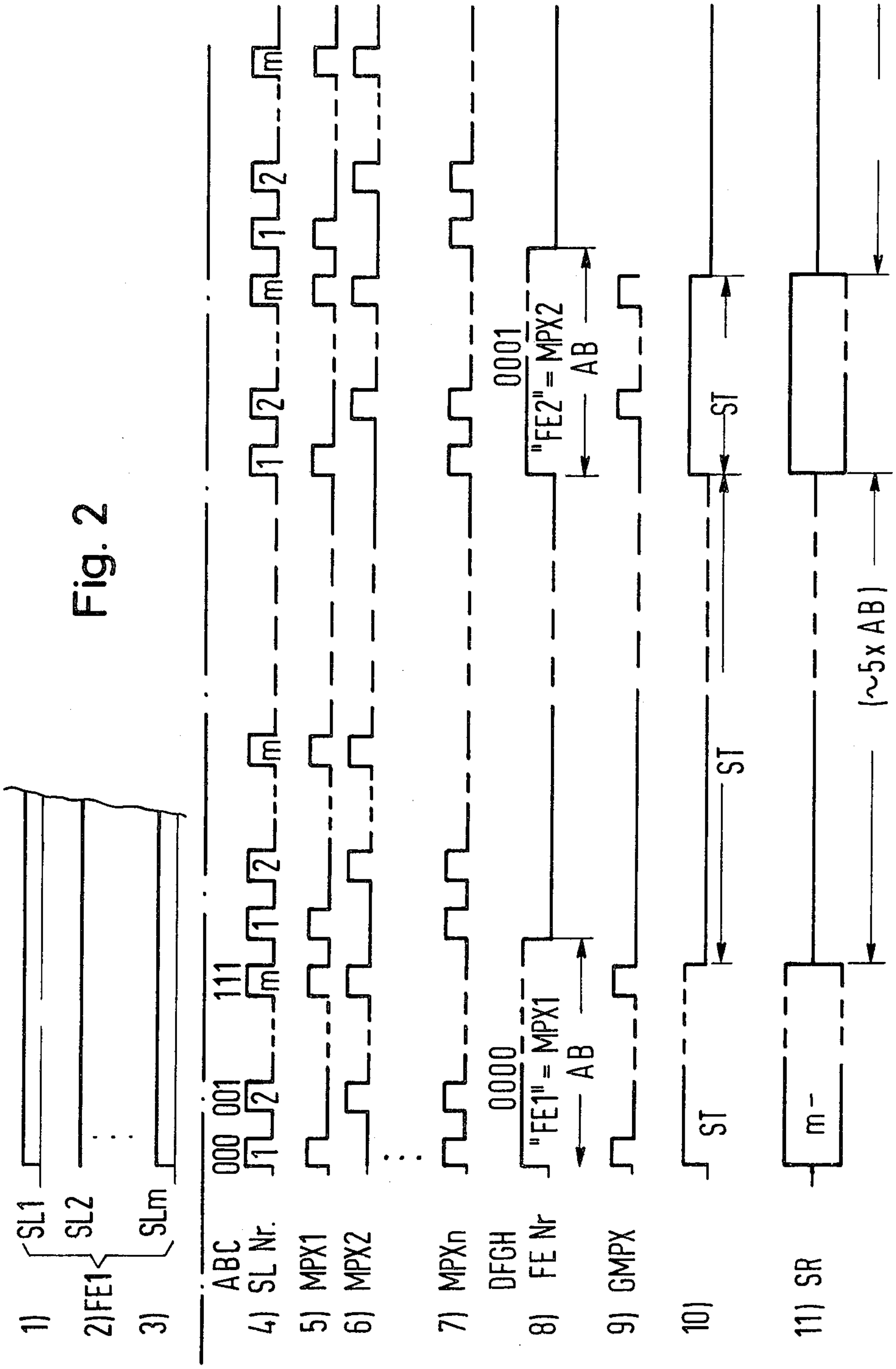
FIG. 2 is a time-waveform diagram illustrating operations at various points in the apparatus.

It is assumed that the signal states shown in lines 1, 2 and 3 of FIG. 2 appear on signaling lines SL1, SL2 to SL$m$ of the functional unit FE1. The signal states appearing on signaling lines of the other functional units FE2 to FE$n$ are not illustrated herein, but would be similar.

Due to the first encoded selection signal transmitted over control leads ABC, the individual signaling lines SL1 to SL$m$ connected to each signal multiplexer SM1 to SM$n$ are switched sequentially to the output of that signal multiplexer. From the sequence of operations illustrated in lines 4 and 5 of FIG. 2 it is apparent that the encoded selection signal 000 represents the address for signaling line SL1. Similarly, the encoded selection signal 001 and 111, respectively, represent the addresses for the signaling lines SL2 and SL$m$. The interrogation of signaling line SL1 causes that line in functional unit FE1 to be switched to the output of signal multiplexer SM1. Thus, on TDM trunk MPX1 there appears the signal state prevailing on signaling line SL1 in functional unit FE1.

Lines 6 and 7 of FIG. 2 show that the above-described form of operation holds true for the other functional units FE2 to FE$n$, whereby the signal states occurring on TDM lines MPX2 and MPX$n$ correspond to the signal state appearing on signaling lines SL1 in functional unit FE2 and on signaling lines SL1 in functional unit FE$n$.

The switching of signaling lines occurs continuously, with the addresses of the signaling lines (the signaling lines numbers are indicated in line 4) causing the connection of the individual signaling lines to the corresponding TDM trunks. Thus, the sampling of the first, second, etc. signaling lines of all functional units occurs sequentially in time with correspondingly number lines in the different functional units being selected at the same time, i.e., in parallel. The transmission of the signal states of a single functional unit occurs serially over the TDM trunk connected thereto.

The reduction of the $n$ TDM trunks MPX1 to MPX$n$ to a single group TDM trunk GMPX occurs in signal group multiplexer SGM, to which are applied, over control leads DEFG, the second encoded selection signals, which in the example permit as a 4-bit code the selection of 16 TDM trunks.

Line 8 of FIG. 2 shows that the encoded selection signal 0000 leads to the selection of TDM trunk MPX1, over which all signal states of functional unit FE1 are transmitted. Thus, throughout the duration of sampling phase AB, the duration of which is defined by the number of signaling lines of a functional unit, the signal states of TDM trunk MPX1 are transmitted to group TDM trunk GMPX (cf. line 9). At the same time, the shift register clock pulse ST is turned on ("ST on" in line 10), so that the signal states transmitted over group TDM line GMPX are transferred to the $n$ stages of shift register SR (line 11). After transferring the signal states to the stages of the shift register, the shift-register clock pulse is turned off ("ST off" in line 10). The signal states of the first functional unit FE1 contained in shift register SR are available as signal states for interpretation (e.g., for visual display). This occurs during the display phase AN, which is preferably 4 to 5 times greater than the sampling phase AB (line 11).

At the end of the display phase the multiplexer control MS delivers the selection signal 0001, which now causes in the signal group multiplexer SGM the selection of the second TDM trunk MPX2. In this way, the signal states occurring on the signaling lines of functional unit FE2 are switched through to group TDM trunk GMPX and, since throughout the duration of the sampling phase AB the shift-register clock pulse ST is turned on anew, these signal states are transferred to shift register SR. During the following display phase AN the shift register contents may again be displayed visually.

It is convenient to combine the visual display means into groups.

In FIG. 1 there are provided in the display panel AZF the display groups AZG1 to AZG$x$, which may each be realized by a series of light-emitting diodes. The actuation of the display occurs in accordance with the signal states stored in the shift register and in accordance with the encoded selection signals controlling the connection of TDM trunks MPX1 to MPX$n$ to group TDM trunk GMPX. These selection signals are decoded in a conventional decoding circuit D in a manner in itself known, so that the release of the indicator switching means occurs in synchronism with the selection of the TDM lines in the signal group multiplexer. There may be fewer display groups than functional ($x < n$).

Further shift register must be provided in addition to the one shown in FIG. 1 if more than one signal group of various functional units are to be displayed concurrently. However, if visual display means with pulsewise actuation are employed, one may also apply the multiprocessing mode using a single shift register.

Selection of the signal states to be displayed may also be effected by varying the shift clock pulse control. In this case, specified shift-register clock pulses of a cycle are blocked.

To enable in certain cases an inverted display of the signal states, it is advantageous to place a pulse-controlled inverting gate before the signal input of the shift register, which is likewise made independent in time of the multiplexer control, thereby inverting specified signal states prior to being placed into storage.

The principles of the invention are described hereinabove by describing a preferred embodiment constructed accordingly. It is comtemplated that the described embodiment can be changed or modified in a number of ways without departing from the scope of the invention as defined by the appended claims.

We claim:

1. Apparatus for sensing, communicating and displaying signal states occurring in a plurality of functional units, comprising:

a plurality of signal multiplexer means, one of which is coupled to each said functional unit for sensing the signal states occurring in that functional unit, group multiplexer means having inputs connected to time division multiplex (TDM) trunks which are connected to outputs of said signal multiplexer means, a group TDM trunk connected to the output of said group multiplexer means, multiplexer control means including means for supplying first encoded selection signals to said plurality of signal multiplexer means for selecting signal lines to be sensed such that signal states from corresponding signal lines from said functional units are sensed at the same time and coupled to said group multiplexer means in parallel and including means for supplying second encoded selection signals for the selection of any of said TDM trunks to be connected through said group multiplexer means to said group TDM trunk in any desired sequence, each said TDM trunk being so connected for the duration of a sampling phase, display means including shift register means for receiving the output of said group TDM trunk, and timing means for supplying timing pulses to said shift register means, said timing pulses being interrupted upon acceptance of sensed signal states for the duration of a display phase.

2. The apparatus defined in claim 1 wherein said means for supplying second encoded selection signals is adapted to provide said second selection signals for selecting each of said TDM trunks in sequence.

3. The apparatus defined in claim 1 wherein said means for supplying second encoded selection signals is adapted to provide said second selection signals for random selection of any of said TDM trunks.

4. The apparatus defined in claim 1 wherein said display means further comprises visual display means connected in parallel to outputs of the stages of said shift register means and further comprising means for actuating said visual display means responsive to said second encoded selection signals.

5. The apparatus defined in claim 4 additionally comprising a plurality of visual display means formed into groups, the number of groups being equal to or smaller than the number of functional units.

* * * * *